United States Patent
Hogg et al.

(10) Patent No.: US 6,654,743 B1
(45) Date of Patent: Nov. 25, 2003

(54) ROBUST CLUSTERING OF WEB DOCUMENTS

(75) Inventors: Tad H. Hogg, Mountain View, CA (US); Rajan M. Lukose, Palo Alto, CA (US)

(73) Assignee: Xerox Corporation, Stamford, CT (US)

(*) Notice: Subject to any disclaimer, the term of this patent is extended or adjusted under 35 U.S.C. 154(b) by 370 days.

(21) Appl. No.: 09/711,479

(22) Filed: Nov. 13, 2000

(51) Int. Cl.[7] .............................................. G06F 17/30
(52) U.S. Cl. ......................................................... 707/7
(58) Field of Search ................................. 707/2, 3, 4, 5, 707/6, 7, 10, 102, 104.1; 704/10, 243; 705/10; 709/201, 202, 218; 715/513

(56) References Cited

U.S. PATENT DOCUMENTS

| | | | |
|---|---|---|---|
| 5,857,179 A | * 1/1999 | Vaithyanathan et al. | 707/2 |
| 5,864,845 A | 1/1999 | Voorhees et al. | 707/5 |
| 5,895,471 A | 4/1999 | King et al. | 707/104.1 |
| 5,924,105 A | 7/1999 | Punch, III et al. | 271/157 |
| 6,038,574 A | 3/2000 | Pitkow et al. | 715/513 |
| 6,078,913 A | 6/2000 | Aoki et al. | 707/2 |
| 6,098,064 A | 8/2000 | Pirolli et al. | 707/2 |
| 6,115,708 A | * 9/2000 | Fayyad et al. | 707/6 |
| 6,119,124 A | 9/2000 | Broder et al. | 707/103 R |
| 6,363,379 B1 | * 3/2002 | Jacobson et al. | 707/5 |

OTHER PUBLICATIONS

"Robust Self–Assembly Using Highly Designable Structures", Nanotechnology 10 (1999) 300–307, Printed in the U.K.

* cited by examiner

*Primary Examiner*—Diane D. Mizrahi
*Assistant Examiner*—Apu Mofiz
(74) *Attorney, Agent, or Firm*—Fay, Sharpe, Fagan, Minnich & McKee, LLP (57) ABSTRACT

A method and apparatus for clustering documents from a set of documents includes issuing a request from an electronic device for documents which are relevant to the request. The documents believed to meet the request requirements are identified and the documents are thereafter supplied to a document clustering system. The document clustering system forms clusters of the documents by operation of the clustering system. A robustness criterion, by analogy with self-assembled physical systems, is applied to select the best, most robust, clustering. Robust clusters have a higher designability feature than other clusters which are generated where designability refers to a number of ways a particular cluster can be formed.

21 Claims, 4 Drawing Sheets

ROBUST CLUSTERING OF WEB DOCUMENTS

BACKGROUND OF THE INVENTION

The present invention is related to the field electronic document collection, and in particular to forming clusters of electronic documents based on some measure of similarity between the electronic documents.

There is an ever increasing volume of electronic information available to a user, as for example found on the World-Wide Web (hereinafter referred to as the Web). Large collections of Web documents are common in many Web-based activities, including searches and analysis of trends and use patterns. Also, as automated commerce develops, manipulating such collections becomes an important activity for software agents. Both consumers and producers of information, therefore would like to understand what kinds of information are available, how desirable the information is, and how its content and use change through time.

Since these collections of data are often unmanageably large, they are often grouped into clusters based on some measure of similarity between documents. Such measures can be based on similar key words, link structures, use patterns or recommendations. Given a choice of similarity measurements, a clustering algorithm is used to form clusters or clusterings containing documents with some form of relatedness. Numerous clustering algorithms have been developed and are in use. For example, clustering algorithms are used by search engines such as Northern Light: (url:http://www.northernlight.com)
or Lycos: (url:http:\\www.lycos.com).

A specific approach to the clustering of documents involves computing inter-document similarities based on content-word frequency statistics. However, a drawback with this technique is that not only is it often expensive, but more importantly its effectiveness was developed and tuned on human-readable texts. It appears, though, that the proportion of human-readable source files for web pages is decreasing with the infusion of dynamic and programmed pages.

Another option of performing clustering of documents is to look at usage patterns. Unfortunately, any clustering based on usage patterns requires access to data that is not usually recorded in any easily accessible format.

Other attempts at clustering hypertext, for example, typically utilize the hypertext link topology of the collection. Such a basis for clustering makes intuitive sense since the links of a particular document represent what the author felt was of interest to the reader of the document. However, such systems are not particularly suited to scale gracefully to large heterogeneous collections like the web.

While the foregoing described clustering techniques are only a representative sampling of those in existence, a common thread among these and others is the use of similarity measures between documents to form a cluster. Unfortunately, similarity measures that are easy to compute do not necessarily capture the relevant aspects of similarity for particular applications. For instance, measures based on matching words can be misled by multiple meanings for words or synonyms. Measures based on link structure or use patterns may be confused by the use of out-of-date web crawlers and the many different types of users and reasons links are included in pages. Such errors in similarity measures can reduce the usefulness of the clusters.

Another problem arises when web documents are returned over a long time interval. In some situations, it may be desirable to begin clustering when only a few documents are available to present some immediate feedback to a user. Once such initial clusters are presented, additional documents that arrive may be forced into inappropriate clusters or force significant changes in the clustering. An example is the on-line hierarchical clustering of news stories. In this case, it may be desirable to have a clustering algorithm that is insensitive to the order in which the stories are received.

In considering the shortcomings of existing clustering algorithms, the inventors have investigated the field of manufacturing self-assembly. Manufacturing often builds objects from their components by directly placing them in the necessary arrangements. Common examples include buildings, cars and electronic circuits. This technique requires knowledge of the precise structure needed to serve a desired function, the ability to create the components with the necessary tolerances and the ability to place each component in its proper location in the final structure.

When these requirements can not be met, self-assembly offers another approach to building structures from components. This process involves a statistical exploration of many possible structures before settling into the final one. The particular structure produced from given components is determined by biases in the exploration, given by component interactions. These biases arise when the strength of interaction between components depends on their relative locations in the structure. Interactions can reflect constraints on the desirability of a component being near its neighbors in the final structure. For each possible structure, the interactions combine to give a measure of the extent to which the constraints are violated, which can be viewed as a cost or energy for that structure. Through the biased statistical exploration of structures, each set of components tend to assemble into that structure with the minimum energy for that set. In these terms, self-assembly can be viewed as a process using a local specification, in terms of components and their interactions, to produce a resulting global structure. The local specification is, in effect, a set of instructions that implicitly describes the resulting structure.

Self-assembly can be very precise in spite of the inherently statistical nature of the process. Examples include chemical reactions driven by diffusive mixing of the reactants, such as the creation of polymers, proteins, and molecular assemblies, patterned mesoscale objects and structures consisting of tiny robots. This technique can also automatically reconfigure structures when their environments or task requirements change, or when a few components break.

The inventors have determined the self-assembly process to be valuable to approach the task of generating more useful and robust clusters by applying concepts from the field of self-assembly to the clustering of web-based documents.

SUMMARY OF THE INVENTION

A method and apparatus for clustering documents from a set of documents includes issuing a request from an electronic device for documents which are relevant to the request. The documents considered to meet the request requirements are identified and the documents are thereafter supplied to a document clustering system. The document clustering system operates to form clusterings of the documents. A self-assembly process is instituted to then obtain robust clusterings and the robust clusterings are displayed for the user's view. Robust clusterings have a higher designability feature than other clusters which are generated, where designability refers to a number of ways a particular clustering can be formed.

DETAILED DESCRIPTION OF PREFERRED EMBODIMENTS

Forming document clusters from a collection of electronic documents is viewed as a virtual self-assembly process. The clusters are formed by testing a variety of possible clusters to group similar documents together. Due to mistakes in the similarity measure or conflicting user requirements, there may be a number of clusters that appear to be equally reasonable. The present invention provides an apparatus and process for developing and selecting robust clusters which have a wide range of usability even when mistakes in the similarity measure or conflicting use requirements exist.

For example, a cluster may be formed to specifically focus on what is a predicted or interpreted request by a user. When the predicted or interpreted request is accurate with the actual request of a user, a high usability match occurs. However, if a misinterpretation or misunderstanding in the prediction or interpretation occurs, the cluster provided is of little value. This type of cluster might be considered a fragile cluster. The present invention is directed toward designing, through the use of self-assembly concepts, highly designable robust clusters.

Figure 1:
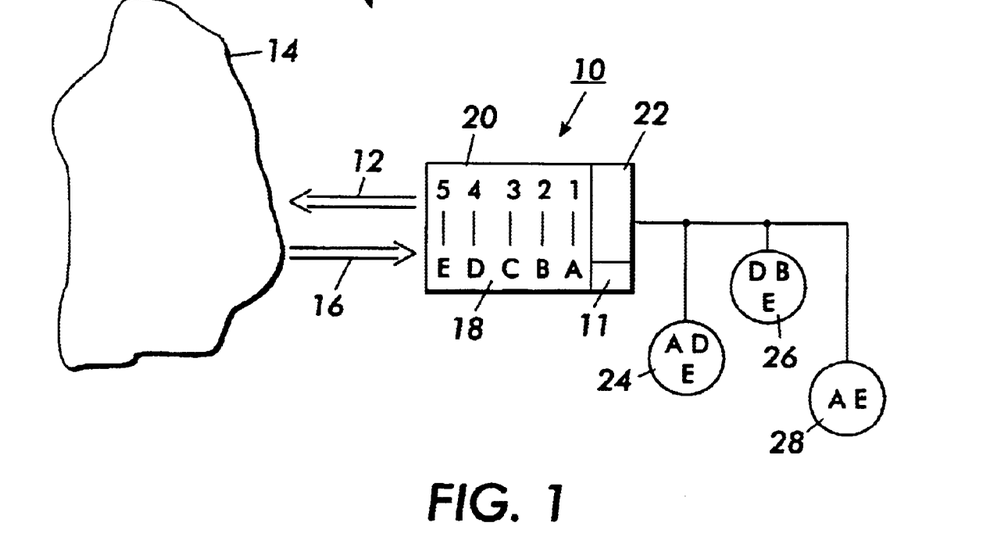
FIG. 1 sets forth a computerized system which retrieves information from a database in the form of documents, and provides for the arrangement of those documents into preferred clusters by a clustering system.

Turning to FIG. 1, illustrated is a system A to which concepts of the present invention are implemented. In system A, a computer or other electronic device 10 capable of operating a search engine or other electronic searching device 11 issues a request 12 to servers located on the Web of the internet 14. In response to request 12, documents considered as having content meeting the request are located and supplied 16 to server 10. It is to be noted that the documents to be clustered in this embodiment are obtained by accessing the internet, the present invention may also be used to cluster documents from other electronic systems, such as internal corporate/organizational database systems.

The returned documents (Doc-A, Doc-B, Doc-C, Doc-D, Doc-E) 18 are received in a time order (1, 2, 3, 4, 5) 20. The received time ordered documents are supplied to a clustering system 22 which may be contained within computer 10 or as a separate element. Clustering system 22 includes a known clustering algorithm, and is designed to receive the ordered documents Doc-A–Doc-E 18. Clustering algorithm 22 then functions to generate clusters such as, Cluster-A, 24, Cluster-B, 26, and Cluster-C, 28. Each cluster 24–28 includes documents which have been determined by the cluster algorithm 22 to be somehow relevant to each other and useful to a user.

Figure 2:
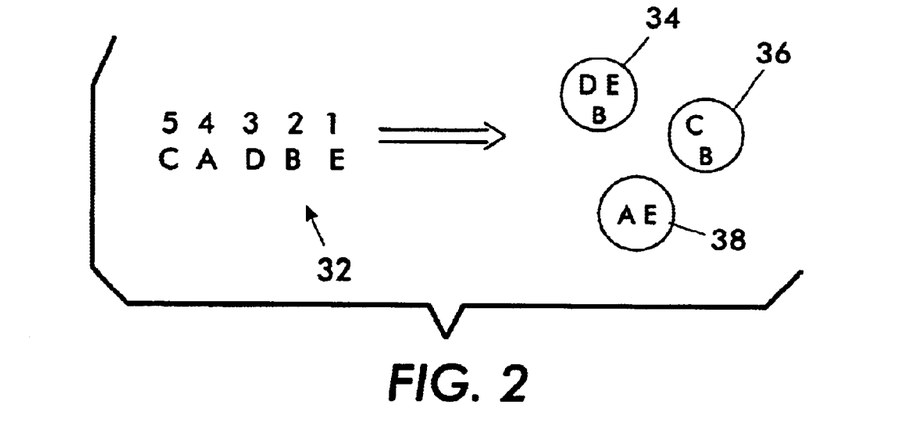
FIG. 2 illustrates the reordering of documents received in the system of FIG. 1 and the resultant clusters which are obtained thereby.

Clustering system 22 of FIG. 1 uses the time order in which each of the documents were returned to server 10 as at least one similarity measure. Therefore, and as shown in FIG. 2, if the same documents 32 were received in a different time order, then the resulting clusters may have different documents formed together in a cluster (e.g., 24, 26, 34, 36). However, other clusters may contain the same documents (28,38).

Therefore, if clustering system 22 is provided with multiple orderings of the same documents, those clusters which show a high degree of repeatability for many different orderings may be considered robust clusters.

Robust clusters are, therefore, formed in relatively many ways from a variety of detailed choices for similarity measures, for example the order in which the documents are considered, and other sources of variation. These features reflect the high designability of robust clusters.

Figure 3:
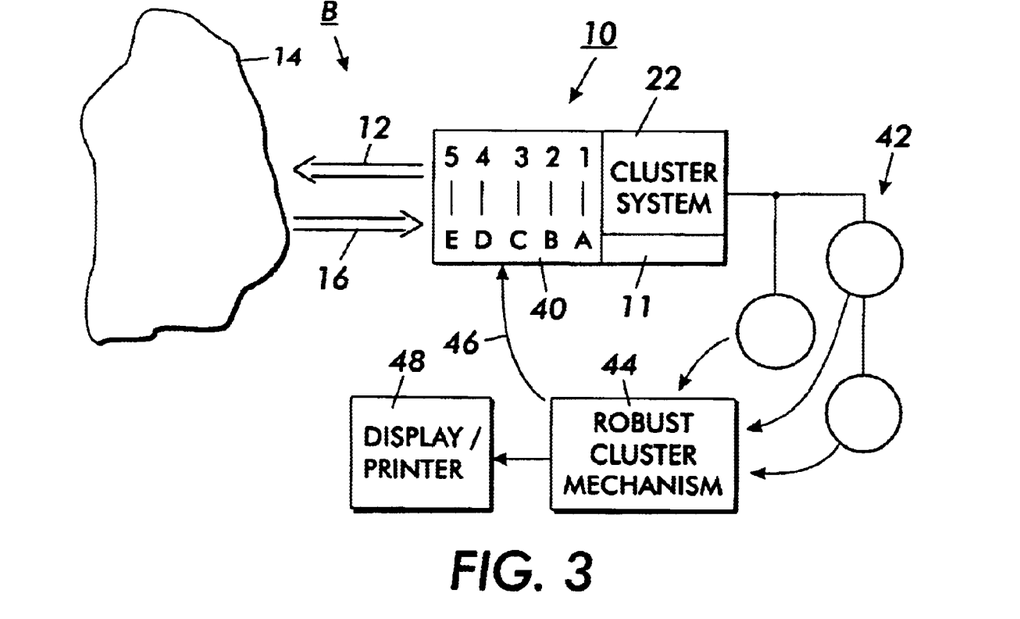
FIG. 3 sets forth an embodiment of the present invention for use of a single clustering system having multiple document orderings presented to the system.

With attention to FIG. 3, illustrated is a system B according to the present invention which implements self assembly processing. Along with computer or electronic device 10, search engine 11 and cluster system 22, system B includes ordered input 40, cluster outputs 42, robust cluster mechanism 44, reorder command 46 and display or printer 48. In operation, ordered input documents 40 which have been received by computer 10 (such as documents Doc-A–Doc-E of FIG. 1) are input to clustering system 22. Thereafter, cluster outputs 42 are obtained, and supplied to robust cluster mechanism 44. A reorder signal or command 46 causes the ordered document input 40 to be reordered. The reordered documents are then supplied to cluster system 22, which generates new cluster outputs 42 that are in turn supplied to robust cluster mechanism 44. This process is repeated a predetermined number of times until a desired number of cluster outputs 42 are obtained and stored within robust cluster generator 44. In one embodiment robust cluster generator 44 generates histograms, to identify which clusterings are being repeated and the number of repeatings.

Figure 4:
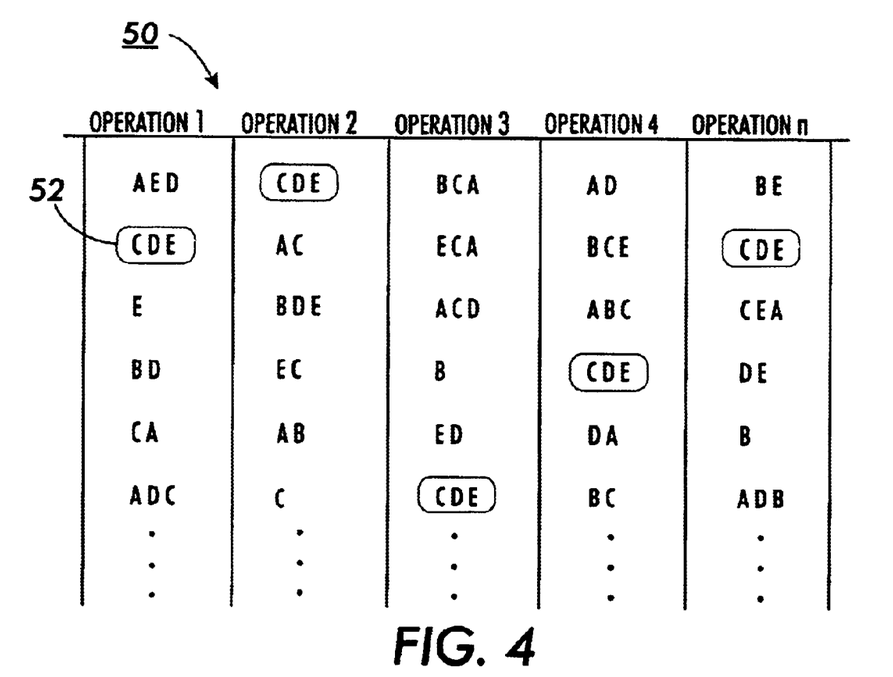
FIG. 4 depicts clusterings which may be obtained by multiple reordering operations.

FIG. 4 illustrates a simplified listing of what may be stored within robust cluster mechanism 44. In particular, each cluster generated by operation of cluster system 22 is listed (i.e. operation 1, 2, 3, 4, n) 50. Using this information, robust cluster mechanism 44 determines which clusters have a high designability, i.e. they are randomly generated over a number of different processes or operations. In this example, it can be seen that cluster CDE 52 has a high designability factor as it is formed by each of the clustering operations (i.e. reordering of documents A–E). Therefore, robust cluster mechanism 44 outputs cluster CDE 52 to a user via display or printer 48.

Implementation of clusters with high designability increases the likelihood that these robust clusters will satisfy a user's request even with defects in the similarity measurements used, and/or an imperfect prediction of the user's request. That is, the resulting clusters are not highly sensitive to the errors that may occur in the local specification.

A formalized discussion of the designability of clusters, assumes G is a robust cluster and L is a collection of documents, or the local specification. Then the interactions among the documents based on their placement in the cluster can be viewed as defining an energy E (G, L). Small values for the energy correspond to robust clusters that satisfy many of the constraints, i.e. will be formed for a variety of clustering operations. A useful robust cluster for a given set of documents L is the one that minimizes this energy. With a sufficient statistical exploration of the possible clusters the minimum energy cluster will be the one eventually assembled from L. Notationally, let L→G denote the robust cluster G is the assembled result from L. That is, among all possible clusters, G has the minimum energy for L.

In this context, we can ask how many different document sets assemble to the same cluster G. We refer to this count as the designability of the cluster i.e., $$d(G)=|\{L|L \to G\}| \tag{1}$$

where |...| denotes the size of a set and $\{L|L \to G\}$ is the set of all document collections that assemble to G.

A given assembly process can then be characterized by a distribution of designability, i.e., the number of clusters with various designability values. This distribution is given by values of $|\{G|d(G)=x\}|$ over a range of choices for x.

Figure 5:
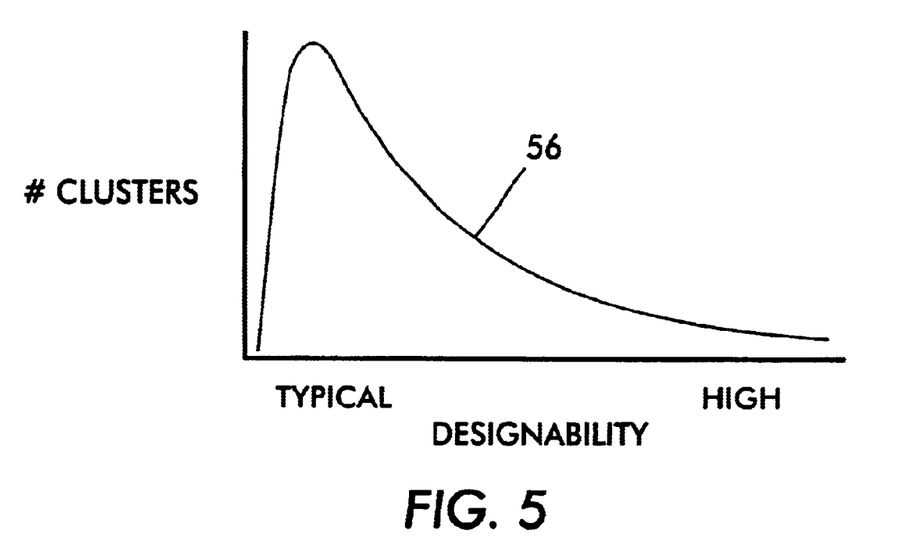
FIG. 5 is a schematic distribution of designability of different document configurations producing various clusters, each point on the curve indicating a number of clusters with a given designability.

A schematic example of such a distribution is shown in FIG. 5 which graphs the number of clusters versus the designability for the cluster from a typical designability feature to a high designability feature, as represented by designability curve 56. Where each point on curve 56 indicates the number of clusters with a given designability. The long tail of the distribution indicates a few clusters are highly designable, and far more are typical cases. These highly designable robust clusters can be formed in relatively many ways in response to interactions among the documents. Thus robust clusters are relatively more tolerant of errors in the choice of documents than is typically the case, producing one form of robustness for self-assembly.

Designability can be contrasted with measures of the entropy of a cluster G. For instance, among all document collections L that produce G, we can determine the fractions that have various properties, and their correlations. These properties could include choices relevant for the design, e.g., the choice of a particular similarity measure. The extent to which most of the documents in a collection L producing G have the same value for a particular property indicates the importance of that property for the overall design. Identifying the important properties for a given cluster is useful for improving the clustering process. Moreover, if the important choices tend to be independent, identifying an appropriate self-assembly process is simplified since each such choice can be considered separately from the others. Because highly designable clusters can be formed in a relatively large number of ways, they should be more likely than typical clusters to allow independent changes in their documents without significantly changing reliability of the final assembled cluster. With respect to a set of property values S characterizing the document choices, this degree of independence can be characterized by an entropy measure based on assuming the choices for these properties for the documents are independent, i.e., $$H(G) = -\sum_i \sum_{s \in S} f_s(i) \log f_s(i) \tag{2}$$

where the outer sum ranges over the documents in the set L and $f_s(i)$ is the fraction of times, among the document collections L that produce G, that the ith document has property value s. Independence of the property choices for the different documents is indicated when H(G) is close to log d(G), i.e., the entropy characterizes the number of ways G can be constructed. With strong dependences in the choices, H(G) will be much larger than this value.

A simple generalization of this definition of designability is when a variety of clusters have the same or similar content. In such cases, rather than requiring a single specific resulting cluster, a self-assembly process that produces any cluster with the desired behavior can be viewed as successful. This leads to considering functionally identical clusters as equivalent when defining designability. That is, an equivalence relation, G≡G', can be defined on the clusters that give rise to identical behaviors for the particular application under consideration. Designability then becomes:

$$d(G)=|\{L| \text{ for some } G', L \to G' \text{ and } G \equiv G'\}| \tag{3}$$

Thus an additional ingredient to consider for designing self-assembly clustering processes is the actual performance requirement for the resulting cluster, rather than limiting attention just to forming a particular cluster.

A further generalization of designability is to continuous measures of the quality of the resulting cluster. That is instead of asking that the cluster have information identical to that desired, it may be sufficient if the resulting information is close to the desired data. Highly designable clusters are still useful in this context, in that they are most likely to still be useful in spite of variations in the documents. However, for comparing various options the measure of designability may include not only how many L produce the desired data but also how well they do so:

$$d(G) = \sum_{G'} q(G', G)|\{L | L \to G'\}| \tag{4}$$

where q(G',G), in the range 0 to 1, denotes how well the cluster G' resulting from L provides the data desired for G. When q(G',G)=1 when G'=G and is 0 otherwise, this definition of d(G) reduces to equation (1).

As a final note, from the viewpoint of constraint satisfaction problems, designability is related to studies of situations that give rise to stable solutions, i.e. solutions that remain solutions even with a few changes in the constraints. Failing this, solutions should at least be easy to fix when conditions change, corresponding to simple repairs that require only adjusting a few documents.

As self-assembly operates, the components perform a biased statistical sampling of the possible clusters on the way to forming the selected cluster. This process allows a variety of clusters to be formed. Unfortunately this exploration can also lead to continual and undesired changes in the final cluster. In some situations it will be possible to terminate the exploration by an explicit command. In other cases, this may not be possible because the continual changes are needed to keep the system adaptable to further unexpected changes. This latter example illustrates a possible trade-off in the design of clusters, making them stable against undesired changes but still allowing them to change when appropriate.

Designability addresses the sensitivity of the cluster forming process to errors in the local specification, or instructions. Another important property is the extent to which desired clusters can resist continual environmental noise once formed. This property of self-assembled clusters can be formalized by their energy gap, the difference in energy, due to interactions among the documents, between the clusters with the smallest energy for those documents and that cluster with the second smallest energy:

$$gap(G, L) = \min_{\{G' | E(G', L) > E(G, L)\}} E(G', L) - E(G, L) \quad (5)$$

Corresponding to the first generalization of designability described above, when the focus is on functionally identical clusters, this definition for the gap generalizes to computing the minimum over $\{G' | E(G', L) > E(G, L) \text{ and } G' \neq G\}$. Clusters with relatively large energy gaps will be more robust with respect to changes than those with smaller gaps. One way to characterize this value for a given cluster G is with the average of the energy gap associated with all document configurations that produce G, i.e., $$gap(G) = \frac{1}{d(G)} \sum_{\{L | L \to G\}} gap(G, L) \quad (6)$$

This average will be a useful characterization when most values of gap (G,L) are fairly close to the average.

Designability reflects the behavior of a given cluster with respect to different sets of documents or different arrangement of documents. Thus it characterizes the effect of errors or other changes in the set of documents. By contrast, the energy gap characterizes a given set of documents with respect to the different clusters that set could form.

Figure 6:
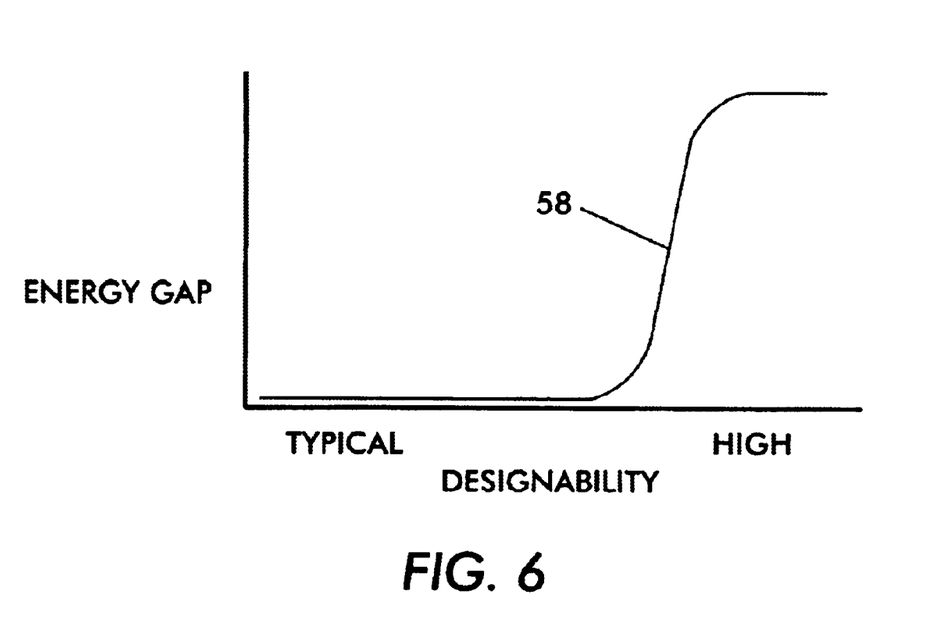
FIG. 6 is a schematic illustration of one way robustness of clusters can vary with their designability.

Significantly, self-assembly processes with skewed distributions of designability can also produce relatively large energy gaps for the highly designable clusters, as illustrated in FIG. 6. This schematic example illustrates one possibility, where curve 58 shows an abrupt transition in the energy gap as designability increases. Such a situation would be another example of the transition phenomena commonly found in constrained systems, both physical and computational. Another possibility is for a smooth increase rather than an abrupt change.

This association is easily understood since small changes in the set of documents will usually result in only small changes in the energies of new configurations. This is because the overall energy E(G,L) is usually due to the interactions among documents based on their inclusion or location in a cluster. For clusters consisting of many documents, changing a few documents will only modify a small fraction of the total, and typically give a relatively small shift to the energy associated with each cluster. That is, a small change from L to L'will usually result in corresponding small changes in energy from E(G,L) to E(G,L'). Thus large gaps are likely to be associated with structures that are energy minima for many different local specifications, i.e., structures that are highly designable.

Designability and the energy gap determine the robustness of the final clusters with respect to variations in the set of documents, interactions or environment.

Another important issue is the length of time self-assembly takes. While clusters can be explored rapidly, the number of possible clusters often grows so rapidly with an increase in the number of documents that they cannot all be examined in any reasonable amount of time. Fortunately, the biases introduced in the exploration by the interactions can greatly reduce the number of clusters that need to be examined.

In some cases, these interactions can also give rise to local minima, clusters with lower energy than all their neighboring clusters but still with relatively high energy. Such situations lead to sluggish behavior because the system can remain in a local energy minimum a long time. In such cases, the bias in the exploration toward lower energy structures tends to keep the system in the local minimum.

The extent to which local minima are a problem depends on several factors. First, for some applications a cluster corresponding to a local minimum may be quite adequate, even though it does not satisfy the constraints as well as the true minimum. Second, the number of initial clusters leading to the true minimum may be much larger than those leading to local minima. This is often the case when the true minimum is associated with a large energy gap and the individual constraints are relatively weak. Third, if the system allows a find degree of control over the document, it may be possible to explicitly plan a sequence of motions to avoid local minima. Finally, local minima may be fairly rare.

One way to reduce the number of local minima is through another statistical property of systems with many components: with a sufficient number of ways to change a structure, i.e., a sufficiently high dimensional space of configurations, there is likely to be at least one direction in the space allowing the energy to decrease. This observation can be formalized by examining the statistical distribution of stability, particularly the existence of energy minima, in the space of configurations. Specifically, the stability is determined by the eigenvalues of the matrix of derivatives (the Jacobian) of the forces acting on the system, e.g., due to component interactions. Generally, increases in the size of such matrices or the variation in their values lead to instabilities, i.e., the local minimum becomes a saddle point with at least one direction of change giving lower energy.

Figure 7:
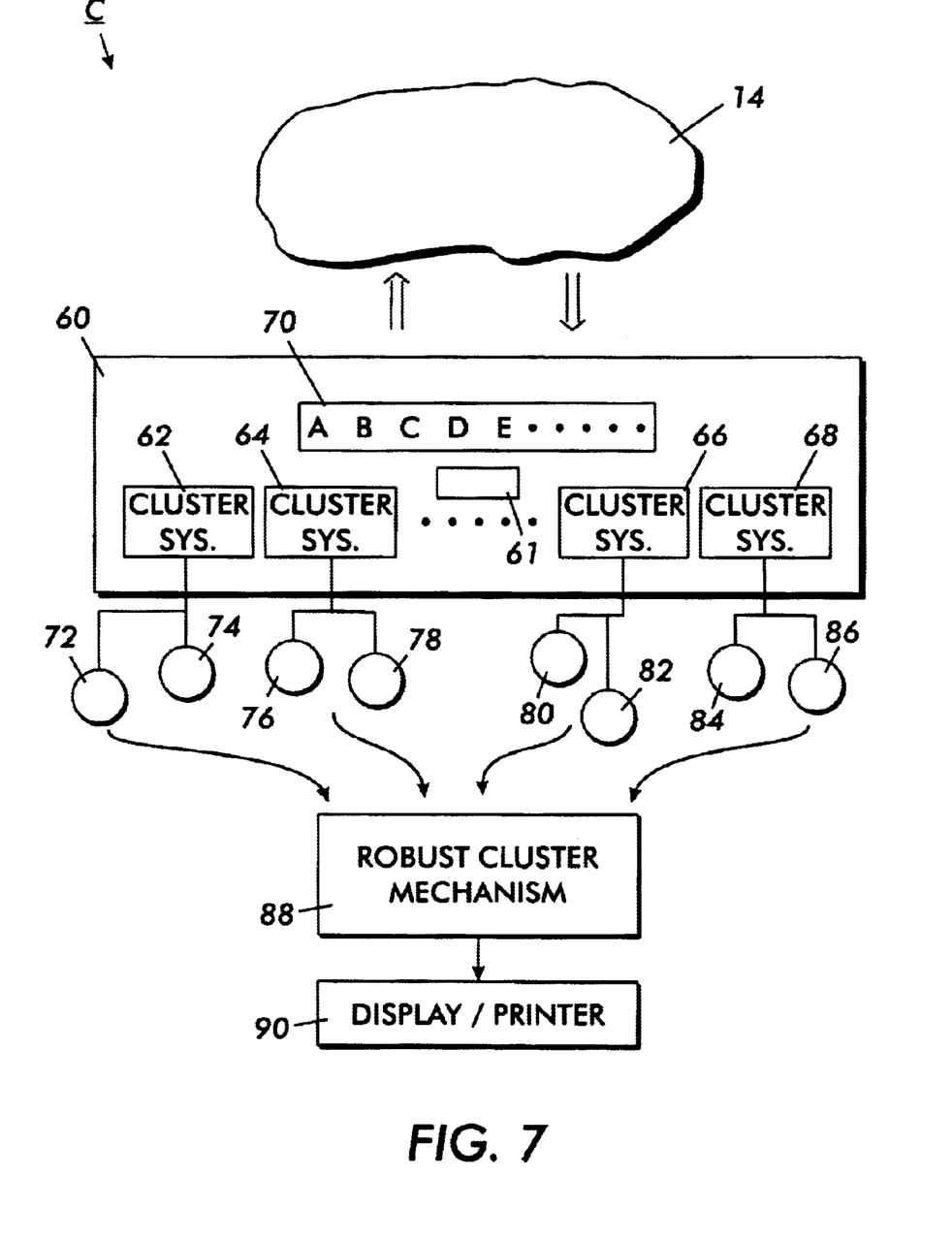
FIG. 7 illustrates a second embodiment of the present invention wherein multiple clustering algorithms are used to obtain a robust cluster.

FIG. 7 illustrates another system C embodiment for implementing the concepts of the present invention. Computer or electronic device 60 with a search engine or other electronic search device 61 is configured with a plurality of clustering systems 62–68, where at least some use different clustering algorithms from each other. For example, the clustering algorithms may use different similarity measures and/or processing techniques. Each of the clustering systems 62–68 receive sets of documents 70 obtained from web or internet 14 corresponding to requests issued via a search engine operating on computer 60. Outputs 72–86 of cluster systems 62–68 are supplied to robust cluster mechanism 88 which, in a fashion similar to robust cluster mechanism 44 of FIG. 1, identifies highly designable clusters which may then be supplied to display or printer 90 for use by a user.

It is to be appreciated, that the embodiments of FIGS. 3 and 7 may be combined to allow each cluster system 62–68 to have the same data repetitively supplied (e.g. reordered) such as described in connection with FIG. 3. Thereafter, selected robust clusters from each cluster system may be operated on as described in connection with FIG. 7.

Highly designable robust clusters have a particular usefulness in situations where the characterization of desired results is difficult to define. One such situation would be where providing the most relevant topic categories for a particular search, where much of the background context or intended use of the results are not available to the system. Assuming a range of possibilities in using designability as an additional criteria provides a path to improve the likelihood that the resulting clusters match the intentions of the user.

Another area where the present invention may find usefulness is in connection with long-term software agents. For example, within an ongoing framework of electronic commerce transactions, genetic algorithms or other system improvement mechanisms could be used to gradually improve the choices of similarity measures. One aspect of this procedure would potentially focus on improving designability as a way to better prepare for future changes in the system.

The use of highly designable clusterings generalizes to hierarchical groupings, e.g., of course in fine levels of topic discussions. For instance, documents processed on a continuing basis such as news stories could have a natural hierarchy of time scales for successively larger changes in topics. By the choice of time constants and probabilistic variations in agent behaviors, this could effectively decouple the different aggregation levels of the systems. This difference in time scales gives a nearly decomposable overall structure which provides stable construction in many natural and artificial systems.

The use of a self-assembly process operation in clustering documents based on similarity measures can also be useful in view of other software tasks. Specifically, from the viewpoint of constraint satisfaction problems, designability is related to studies of stable conditions, i.e., solutions that remain solutions even with a few changes in the constraints. Failing this, solutions under this scenario would at least be easy to fix when conditions change.

Finally, as finding and identifying highly designable clusterings may involve significant computational resources, it may be useful in the present invention to obtain information as to whether a good clustering can be developed a priori based on samples of web-based tasks rather than requiring the finding of new clusterings from scratch for each application. Therefore by implementing these a priori-based samples, a more efficient system may be obtained.

While the present invention is described with respect to a preferred embodiment, it would be apparent to one skilled in the art to practice the present invention with other configurations and with digital document management systems not obtaining information from the World Wide Web. Such alternate embodiments would not cause departure from the spirit and scope of the present invention. For example, the present invention may be implemented as software instructions residing on a suitable memory medium for use in operating a computer-based system having access to the World Wide Web or configured to be maintained within an environment not connected to the World Wide Web.

Having thus described the preferred embodiments, what is claimed is:

1. A method for clustering documents from a set of documents, comprising the steps of:
    (a) issuing a request from an electronic device for documents which are relevant to the request;
    (b) identifying documents intended to meet the request;
    (c) supplying the documents to a document clustering system;
    (d) forming a clustering of the documents by operation of the clustering system;
    (e) repeating steps c and d for a predetermined number of repetitions, using systematic variation in supplying the documents to the document clustering system and in clustering the supplied documents, wherein using the systematic variation in supplying and clustering documents include at least one of presenting the documents in different orders through statistical sampling, applying different clustering algorithms and using different similarity metrics;
    (f) identifying clusterings formed by operation of steps c, d, and e, including a frequency with which each clustering occurs; and
    (g) selecting a robust clustering based on the frequency of occurrence.

2. The method according to claim 1 wherein the robust clustering is one that is formed most often.

3. The method according to claim 1 wherein identifying how often a cluster occurs includes a step of generating a histogram of the clusterings produced by the repetition.

4. The method according to claim 1 wherein using systematic variation in supplying and clustering documents include at least one of presenting the documents in different orders through statistical sampling, applying different clustering algorithms and using different similarity metrics.

5. The method according to claim 1 wherein the document clustering system includes a plurality of document clustering systems.

6. The method according to claim 1 wherein the repeating step, includes applying a varying order of the documents to the clustering system.

7. The method according to claim 1 wherein the step of forming clusters includes organizing the individual documents of the set of documents based on a similarity measure.

8. The method according to claim 1 wherein designability defines a robustness of the cluster.

9. The method according to claim 6, wherein designability refers to a number of ways a particular cluster can be formed.

10. The method according to claim 1 further including a step of displaying the robust cluster to a user.

11. A method for clustering documents from a set of documents, comprising the steps of:

(a) issuing a request from an electronic device for documents which are relevant to the request;

(b) identifying documents intended to meet the request;

(c) supplying the documents to a document clustering system;

(d) forming clusterings of the documents by operation of the clustering system, the supplying and forming steps using systematic variation in the supplying of the documents to the document clustering system, and the forming of the clusterings of the documents, wherein using the systematic variation in supplying and clustering documents include at least one of presenting the documents in different orders through statistical sampling, applying different clustering algorithms and using different similarity metrics;

(e) performing processing operations on the clusterings formed by operation of the clustering system; and (f) selecting a robust clustering through operation of the performing step.

12. The method according to claim 11 wherein the step of performing processing operations includes a step of generating a histogram of the clusterings.

13. The method according to claim 11 wherein the document clustering system includes a plurality of document clustering systems.

14. The method according to claim 11 wherein the step of forming clusters includes organizing individual documents of the set of documents based on a similarity measure.

15. The method according to claim 11, wherein the greater a designability of a cluster, the more robust the cluster.

16. The method according to claim 15, wherein designability defines a robustness of the cluster.

17. The method according to claim 11 further including a step of displaying the robust cluster to a user.

18. The method according to claim 11 wherein the robust clustering is one that is formed most often.

19. An apparatus for generating a robust cluster from a set of electronic documents comprising:

a clustering system designed to receive a set of documents and to form clusterings of documents from the set, the clustering mechanism designed to provide documents and to perform a plurality of clustering operations using a systematic variation, the using of the systematic variation in supplying and clustering documents including at least one of presenting the documents in different order through statistical sampling, applying different clustering algorithms and using different similarity metrics; and a robust cluster mechanism designed to receive the clusterings and perform self-assembly processing operations to select at least one robust clustering.

20. The method according to claim 19 wherein the greater a designability of a cluster, the more robust the cluster.

21. The method according to claim 19, wherein designability refers to a number of ways a particular cluster can be formed.

* * * * *